(12) United States Patent
Viorel et al.

(10) Patent No.: US 11,297,650 B2
(45) Date of Patent: Apr. 5, 2022

(54) SYSTEMS AND METHODS FOR SIGNAL DETECTION USING PHY LAYER PROCESSING

(71) Applicant: CABLE TELEVISION LABORATORIES, INC, Louisville, CO (US)

(72) Inventors: Dorin Gheorghe Viorel, Erie, CO (US); Jennifer Andreoli-Fang, Boulder, CO (US); Belal Hamzeh, Westminster, CO (US); Josh Redmore, Longmont, CO (US); Carey Sonsino, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 43 days.

(21) Appl. No.: 16/876,176

(22) Filed: May 18, 2020

(65) Prior Publication Data

US 2020/0281020 A1 Sep. 3, 2020

Related U.S. Application Data

(60) Division of application No. 16/282,171, filed on Feb. 21, 2019, now Pat. No. 10,660,132, which is a
(Continued)

(51) Int. Cl.
*H04W 74/08* (2009.01)
*H04W 8/00* (2009.01)
(Continued)

(52) U.S. Cl.
CPC ...... *H04W 74/0816* (2013.01); *H04B 17/345* (2015.01); *H04W 8/005* (2013.01);
(Continued)

(58) Field of Classification Search
CPC . H04W 74/0816; H04W 8/005; H04W 16/14; H04W 24/02; H04W 84/042; H04W 84/12; H04B 17/345
(Continued)

(56) References Cited

U.S. PATENT DOCUMENTS 5,396,370 A 3/1995 Behr et al.
2003/0043073 A1 3/2003 Gray et al.
(Continued)

*Primary Examiner* — Obaidul Huq
(74) *Attorney, Agent, or Firm* — David Daniel Smith

(57) ABSTRACT

A method for detecting aggressive signal transmission signatures in a wireless communication network is provided. The network includes at least one cooperative device, an access point, and at least one non-cooperative device. The method includes steps of generating a matrix of at least 8 bits configured to register each instance of at least one of a clear-to-send frame and a request-to-send frame transmitted between the at least one cooperative device and the access point during a specified duration, calculating a cumulative distribution function based on the registered instances within the generated matrix for a probability of the presence of an aggressive transmission signal by the at least one non-cooperative device within a measurable vicinity of one or more of the cooperative device and the access point, and determining the presence of the aggressive transmission signal based on the calculated cumulative distribution function being greater than a predetermined threshold.

5 Claims, 3 Drawing Sheets

Related U.S. Application Data continuation of application No. 15/439,814, filed on Feb. 22, 2017, now Pat. No. 10,225,863.

(60) Provisional application No. 62/307,199, filed on Mar. 11, 2016, provisional application No. 62/298,037, filed on Feb. 22, 2016.

(51) Int. Cl.
   *H04W 16/14* (2009.01)
   *H04B 17/345* (2015.01)
   *H04W 84/04* (2009.01)
   *H04W 84/12* (2009.01)
   *H04W 24/02* (2009.01)

(52) U.S. Cl.
   CPC ............ *H04W 16/14* (2013.01); *H04W 24/02* (2013.01); *H04W 84/042* (2013.01); *H04W 84/12* (2013.01)

(58) Field of Classification Search
   USPC ........................................ 370/310, 328, 329
   See application file for complete search history.

(56) References Cited

U.S. PATENT DOCUMENTS

| | | | |
|---|---|---|---|
| 2004/0037258 A1* | 2/2004 | Scherzer | H04W 28/18 370/338 |
| 2007/0133489 A1 | 6/2007 | Ramesh et al. | |
| 2007/0280116 A1 | 12/2007 | Wang et al. | |
| 2010/0296403 A1 | 11/2010 | Qiu et al. | |
| 2011/0319031 A1 | 12/2011 | McHenry et al. | |
| 2012/0263120 A1 | 10/2012 | Gopalakrishnan et al. | |
| 2013/0136013 A1 | 5/2013 | Kneckt et al. | |
| 2015/0117388 A1 | 4/2015 | Liu et al. | |
| 2016/0037363 A1* | 2/2016 | Kairouz | H04W 24/08 370/252 |
| 2016/0042793 A1 | 2/2016 | Forbes | |
| 2016/0227565 A1* | 8/2016 | Ghosh | H04L 5/0055 |
| 2017/0048879 A1 | 2/2017 | Zhang et al. | |
| 2017/0105217 A1 | 4/2017 | Kwon | |
| 2017/0163322 A1 | 6/2017 | Li et al. | |
| 2017/0208627 A1 | 7/2017 | You et al. | |
| 2018/0063864 A1 | 3/2018 | Tayamon et al. | |

\* cited by examiner

SYSTEMS AND METHODS FOR SIGNAL DETECTION USING PHY LAYER PROCESSING

CROSS REFERENCE TO RELATED APPLICATIONS

This application is a divisional of U.S. application Ser. No. 16/282,171, filed Feb. 27, 2019, which application is a continuation of U.S. application Ser. No. 15/439,814 filed Feb. 22, 2017, now U.S. Pat. No. 10,225,863, which prior application claims the benefit of and priority to U.S. Provisional Patent Application Ser. No. 62/298,037, filed Feb. 22, 2016, and to U.S. Provisional Patent Application Ser. No. 62/307,199, filed Mar. 11, 2016, all of which are incorporated herein by reference in their entireties.

BACKGROUND

The field of the disclosure relates generally to management of shared wireless communications, and more particularly, to wireless communication management utilizing aggressive signal signature detection.

Conventional wireless communication systems may utilize unlicensed shared spectra. For example, the 2.4 GHz, 3.5 and 5 GHz frequency bands could be used for Wi-Fi, Bluetooth, Zigbee, and a range of other consumer, industrial, and medical wireless technologies. Other technology platforms also share a spectrum in other frequency ranges, and available wireless spectra will become more intensively shared as demand for wireless technologies increases. In some instances, the licensed spectra are strictly licensed to specified access technologies, and are not generally used by other access technologies within the same licensed spectrum.

Some conventional shared unlicensed spectrum technology systems utilize algorithm- and sensing-based distributed access, which enable common use of a wireless resource, despite a lack of active coordination among users. For example, typical Wi-Fi systems employ a carrier sense multiple access with collision avoidance (CSMA/CA) network multiple access method, which is also known as "listen-before-talk" (LBT), in which carrier sensing is used, but nodes attempt to avoid collisions by transmitting only when the channel is sensed to be idle (i.e., not being used). Wi-Fi devices employ a common, standards-based protocol to avoid interference among themselves and other users, which provides a substantially equal probability of access across all users in channel conditions.

However, new technologies are being introduced into the shared spectrum, which do not employ the cooperative techniques used by Wi-Fi devices. In particular, the introduction of mobile technologies utilizing Long Term Evolution (LTE) are known to interfere with existing technologies like Wi-Fi, when operating in the same unlicensed spectra and same geographical location, due to the centralized architecture of LTE and mobile systems where spectrum access is scheduled by the core network, instead of being coordinated with other access technologies accessing the same spectra resources. Mobile technologies utilizing LTE may dominate the access to a shared unlicensed spectrum without regard to other wireless access technologies. These non-cooperative mobile technologies can be implemented in an aggressive manner that utilizes a disproportionate share of airtime, as compared with cooperative technologies. For example, when a scheduled technology, such as LTE, competes with a technology that employs distributed coordination techniques, such as Wi-Fi, the Wi-Fi system will inherently defer to (that is, fail to transmit) the scheduled technology. In other words, the Wi-Fi system (and similar cooperative technologies) will "hear" the LTE system (or non-cooperative technologies) "talking," and will wait their turn to access and transmit to the network. Ultimately this type of behavior will drive to an asymmetrical usage of the target spectrum resources, the LTE access technology becoming a dominant user of the spectrum under discussion.

Wi-Fi and other cooperative/distributed technologies are thus at an inherent disadvantage in the shared spectrum, and will experience significant interference, degraded performance, and user experience when forced to compete with non-cooperative technologies as compared with when co-existing with other 802.11 access nodes. Hardware changes to Wi-Fi devices and access points (APs) have been proposed as embedded solutions to detect the non-cooperative (aggressor) signals, but such hardware changes are expensive, and would exclude existing Wi-Fi devices since retrofitting existing 802.11 nodes is prohibitive in operation.

BRIEF SUMMARY

In an embodiment, a method for detecting aggressive signal transmission signatures in a wireless communication network is provided. The network includes at least one cooperative device, an access point, and at least one non-cooperative device. The method includes steps of generating a matrix of at least 8 bits configured to register each instance of at least one of a clear-to-send frame and a request-to-send frame transmitted between the at least one cooperative device and the access point during a specified duration, calculating a cumulative distribution function based on the registered instances within the generated matrix for a probability of the presence of an aggressive transmission signal by the at least one non-cooperative device within a measurable vicinity of one or more of the cooperative device and the access point, and determining the presence of the aggressive transmission signal based on the calculated cumulative distribution function being greater than a predetermined threshold.

In an embodiment, a wireless communications system includes at least one cooperative electronic device including a processor and a transceiver, at least one non-cooperative electronic device, an access point including a memory, and configured to wirelessly send and receive polite transmission data to and from the at least one cooperative electronic device, respectively, and a communications node configured to wirelessly send and receive aggressive transmission data to and from the at least one non-cooperative electronic device, respectively. The transceiver is configured to trigger cycles of clear-to-send (CTS) frames at a selected cadence for a specified duration. The access point is configured to receive the triggered cycles of CTS frames from the transceiver, and store an acknowledgement of each received CTS frame in the memory. The processor is configured to determine a transmission signature of the at least one non-cooperative device based at least in part on the stored CTS acknowledgements during the specified duration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
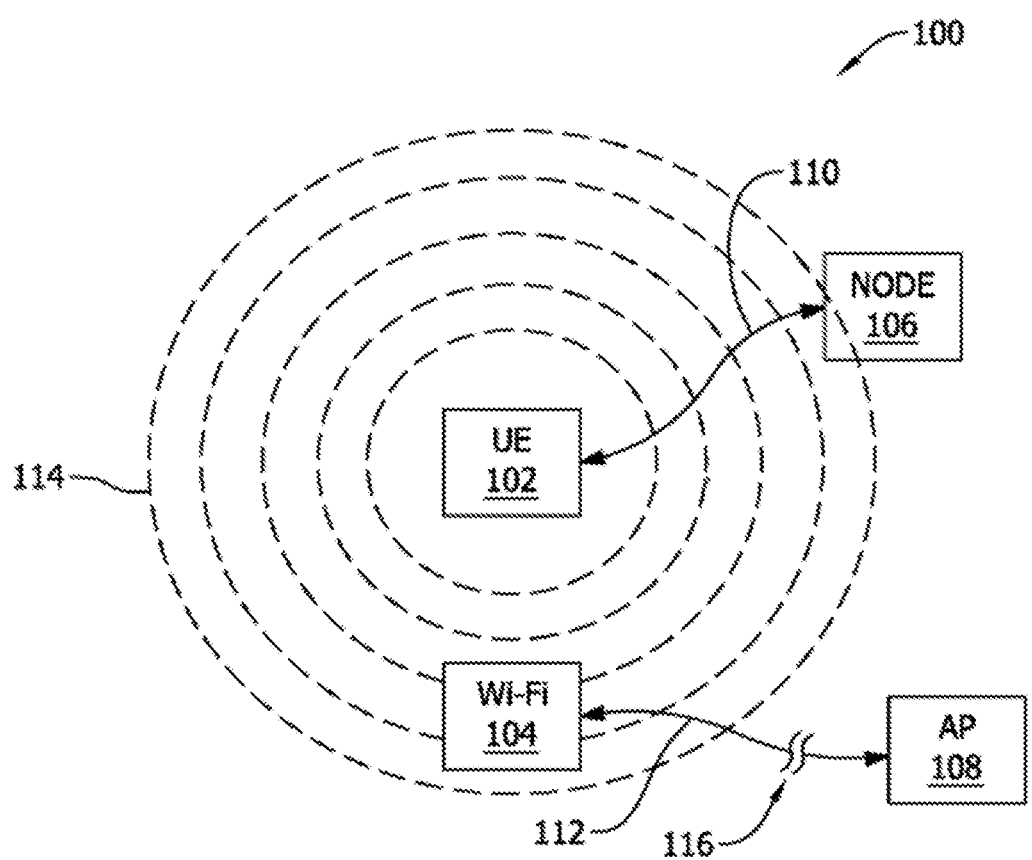
FIG. 1 is a schematic illustration of an operation of co-existent wireless access systems in the same unlicensed spectrum, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following description features processes and systems for utilizing existing wireless transceiver technology to detect the presence of a duty-cycled LTE signal transmitted within the same unlicensed band and geographical location as an 802.11 AP accessible by a wireless transceiver, which may include a CSMA/CA access system. The present embodiments relate to management of wireless communications employing different access protocols operating in the same overlapping coverage area, as well as the management of 802.11 type wireless communications when operating in an overlapping service area with an LTE-U access system.

The embodiments herein describe and illustrate a transceiver and methods for adaptive management of co-existent wireless communications, and particularly wireless communications in the unlicensed spectrum, or unlicensed bands (e.g., 2.4 GHz, 3.5 GHz, 5 GHz, etc.). For purposes of this discussion, the term "co-existent" refers to different wireless access systems re-using the same spectral resources in the same geographical location. The different wireless access systems though, are not necessarily cooperative by nature. Examples of technologies used in the unlicensed spectrum include Wi-Fi, Bluetooth, Zigbee, with Wi-Fi (i.e., 802.11/a/b/g/n/ac/ax/ad and other 802.11 variants) presently being the dominant technology for unlicensed shared access. Wi-Fi is a LBT technology that uses CSMA/CA to optimize the efficiency of distributed access across otherwise asynchronous access transceivers. Such cooperative technology includes coexistence features that allow it to first verify the availability of the media (e.g., by LBT), before accessing a channel, that the channel is clear prior to transmission of data. CSMA/CA then allows for the management of access control to all asynchronous users (i.e., user devices) on that channel.

Mobile technologies such as LTE are synchronous access technologies, operating in the unlicensed spectrum (e.g., LTE-U) in a non-cooperative manner as compared with other access technologies that cannot synchronize to the LTE radio access network (RAN). LTE-U has been widely deployed, and functions to dominate the unlicensed spectrum through a centralized control of aggressive transmission techniques. The cooperative LBT based technologies are colloquially referred to as "polite" technologies, whereas the non-cooperative technologies (including LTE and LAA) are colloquially referred to as "aggressive" technologies. LTE-U is considered aggressive, since it schedules and applies traffic to the accessed channel without first assessing if the channel is clear of other network transmissions. LTE-U may sometimes implement additional features to co-exist with other LTE-U RAN transmissions, but LTE-U will typically take over the channel when co-existing with 802.11 access technologies for more than 50% of the time without such separate systems.

LTE-U generally operates according to an ON/OFF duty cycle. In some instances, the LTE-U duty cycle is static, that is, of substantially constant duration. In other instances though, the duty cycle could be variable. Additionally, more than one aggressive LTE-U signal may be present within the transmission/reception region and spectrum of a polite co-existent access technology The embodiments disclosed herein therefore, feature protocols and methods for aggressive signal detection in shared spectrum resources (or aggregate channels) for both static and variable duty cycles. The disclosed systems and methods are configured to adapt their use of the shared spectrum to enable more efficient access in the presence of non-cooperative technologies. These features thus optimize the operation of 802.11 and other cooperative technologies when co-existing with LTE technologies in unlicensed spectra.

In an exemplary embodiment, existing polite technologies in the unlicensed band are configured to mitigate the transmission from aggressive technologies that are not designed for coexisting with other asynchronous access technologies like 802.11. Such mitigation techniques further configured to operate in their normal manner when in the presence of other polite protocols, but adapt their operation in the presence of aggressive protocols. For simplicity of explanation, many of the following examples are described only with respect to Wi-Fi as the polite protocol and LTE-U as the aggressive protocol. Nevertheless, the systems and methods described herein may also be utilized similarly with respect to other polite and aggressive technologies, respectively.

According to an embodiment, a cooperative technology, such as Wi-Fi, is configured to monitor and/or sense the spectrum for which access is desired, and detect the specific waveforms (also known as "signatures") of non-cooperative technologies, such as LTE. In some examples, the cooperative technology of the present systems and methods are configured to utilize existing IEEE 802.11 wireless networking protocols such as Request to Send (RTS)/Clear to Send (CTS) to detect the presence of a non-cooperative technology signal. In this example, when an aggressive signal is not detected, the cooperative technology can be configured to remain in its legacy state of distributed access protocols. That is, the cooperative technology will respond without changing affecting the functionality and performance of the 802.11 access technology, such as the LBT protocol, for example. However, when an aggressive, non-cooperative technology is detected, the transceiver of the cooperative technology may be further configured to adapt and optimize its performance to wait for the aggressive signal to stop transmitting, avoid the aggressive signal, adjust one or more of the power, throughput, and reliability of the cooperative signal to overcome the aggressive signal, or more generally coexist with the aggressor technology.

As described herein, the phrase "user equipment" includes an electronic device or system utilizing an aggressive, non-cooperative technology protocol, such as LTE-U. The phrase "Wi-Fi device" includes an electronic device, such as a station or STA, that has the capability to use one of the existing 802.11 protocols. For example, a Wi-Fi device can include, without limitation, one or more of a laptop, a desktop personal computer (PC), personal digital assistant (PDA), AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

In the exemplary embodiment, each of the foregoing adaptation techniques may be implemented alone, or in combination with one or more of the other techniques. In some embodiments, the several techniques may be implemented simultaneously, or in succession. In this example, a transceiver or node utilizing cooperative technology is configured to a particular channel of the shared spectrum and to adapt its medium access cooperative protocol in order to maintain its performance in the presence of non-cooperative technologies in the same shared spectrum. These advantageous adaptation techniques are described further below with respect to several drawings.

FIG. 1 is a schematic illustration of an exemplary shared spectrum system 100, according to an embodiment. System 100 includes at least one user equipment (UE) 102, a Wi-Fi device/Wi-Fi station 104, a node 106, and an access point (AP) 108. User equipment 102 may be, for example, a mobile handset, or similar device, that implements an LTE-U transmission protocol to establish an LTE transmission 110 with node 106. In the exemplary embodiment, node 106 may be, for example, an E-UTRAN Node B, also known as Evolved Node B, (abbreviated as eNodeB or eNB) as a hardware element that is communicatively coupled with a mobile phone network (not shown) that communicates wirelessly with user equipment 102. In some embodiments, node 106 may further include a base transceiver station (BTS) for a Global System for Mobile communication (GSM) network. In the exemplary embodiment, Wi-Fi device 104 includes a transceiver or cooperative node (not shown) which establishes a Wi-Fi transmission 112 with access point 108. In an embodiment, the cooperative node of Wi-Fi device 104 includes the transceiver.

In operation, user equipment 102 generates an aggressive transmission signal 114 according to a duty cycle (symbolically represented by dashed lines) within the range of Wi-Fi device 104, which creates an interference 116 in Wi-Fi transmission 112. In the exemplary embodiment, Wi-Fi transmission 112 implements a polite LBT protocol that will typically give way to the detected presence of aggressive transmission signal 114. That is, a cooperative shared spectrum technology, such as Wi-Fi, has the ability to "listen" to the channel of the unlicensed shared spectrum to determine the presence of other users. This listening ability is conventionally employed only for the specific purpose outlined in distributed access protocols for coexistence with other cooperative technologies. FIG. 1 is illustrated schematically, and is not intended to represent the actual scale or proximity of the several elements depicted therein. For example, in practical operation, node 106 may operate at significantly higher power levels than user equipment 102, and thereby be a more significant factor to creating interference 116. Nevertheless, the principles described herein are applicable to either scenario.

In an embodiment, Wi-Fi device 104 is further configured to utilize its existing listening capability to monitor system 100, and then detect and identify the presence of aggressive transmission signal 114. In an example of the operational environment of system 100, Wi-Fi device 104 operates proximate to, that is, side-by-side with one or more cells of user equipment 102. In other words, Wi-Fi device 104 operates according to the 802.11 protocol, and each cell of user equipment 102 is capable of processing its own LTE-U download and upload traffic (e.g., transmission 110 spread. However, since the LTE-U traffic can be transmitted simultaneously with the Wi-Fi traffic (e.g., transmission 112) under some conditions, Wi-Fi device 104 will perceive the received LTE-U traffic as interference (e.g., interference 116), which will degrade the performance of the received Wi-Fi traffic, by either or both of Wi-Fi device 104 and access point 108.

According to the embodiments herein though, either or both of Wi-Fi device 104 and access point 108 are advantageously configured to implement existing technology to detect and process the aggressor LTE-U traffic (e.g., aggressive transmission signal 114) through a novel implementation of the RTS/CTS protocol and the PHY interface. In an exemplary embodiment, Wi-Fi device 104 is configured to cooperate with access point 108 to detect the signature of an aggressive transmission, such as an LTE-U signal, by registering the receipt of individual CTS frames in the PHY layer/interface. As discussed further below, these operational principles can also be applied in the reverse, utilizing the PHY layer of access point 108, and also by registering receipt of individual RTS frames. Once the signature of an aggressive transmission (e.g., aggressive transmission signal 114) is detected, Wi-Fi device 104 is additionally configured to adapt the number of RTS frames transmitted to and received by access point 108 for processing. By adapting the number of RTS frames transmitted and or processed in the presence of an aggressive transmission signal, the present systems and methods are advantageously able to optimize the user throughput and related traffic latency over conventional techniques.

Figure 2:
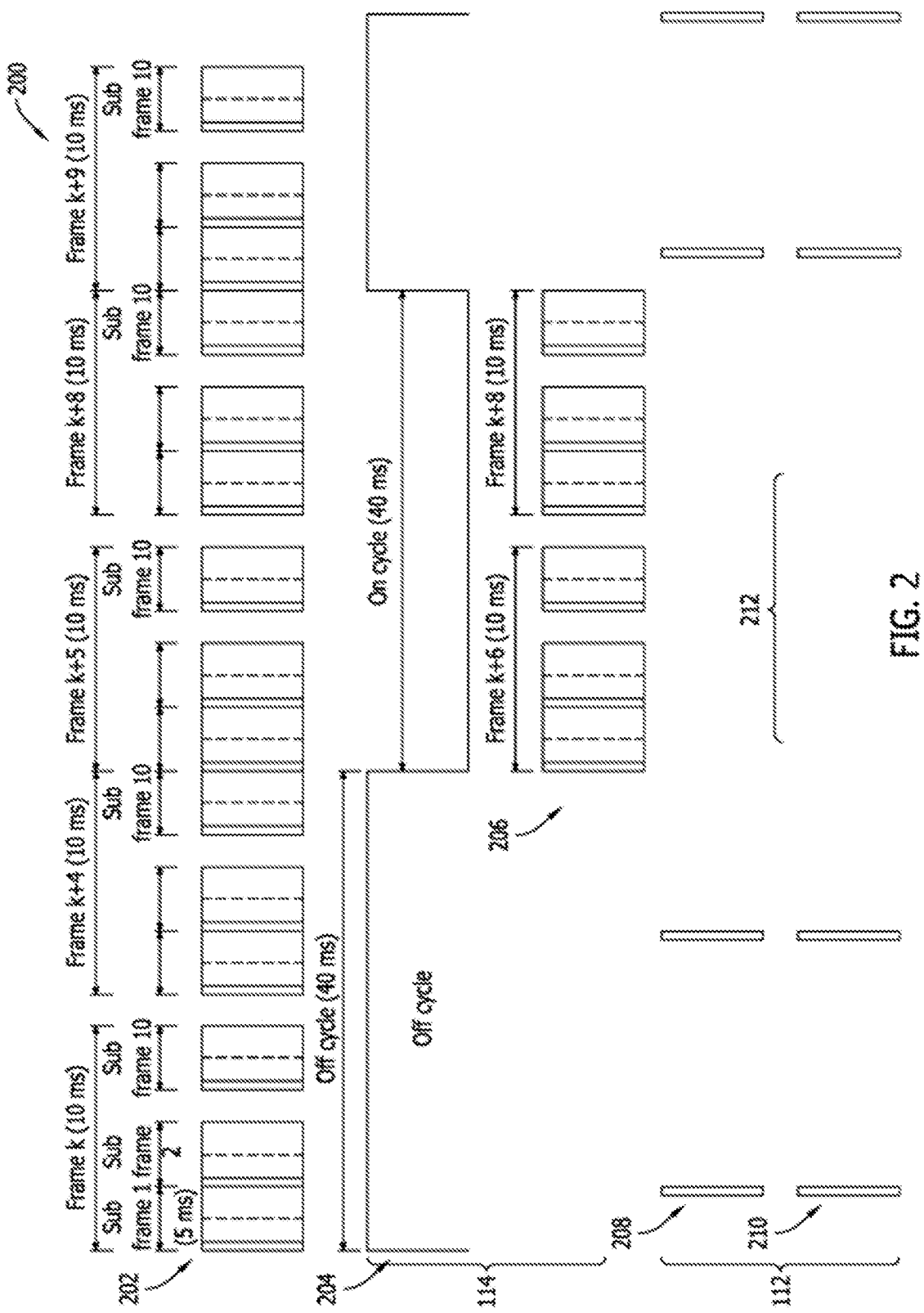
FIG. 2 illustrates an exemplary transmission effect between the aggressive co-existing transmission signal and the Wi-Fi transmission of the system depicted in FIG. 1.

FIG. 2 illustrates an exemplary transmission effect 200 between aggressive transmission signal 114 and Wi-Fi transmission 112 of system 100, FIG. 1. Transmission effect 200 is further considered against a typical LTE signal 202. In the example illustrated in FIG. 2, LTE signal 202 is similar to aggressive transmission signal 114 (e.g., LTE-U signal), except that aggressive transmission signal 114 operates according to a duty cycle, whereas LTE signal 202 does not. For the purposes of this discussion, the lack of duty cycle to LTE signal 202 is not a consideration because LTE signal 202 is not intended for operating in the unlicensed Wi-Fi spectrum band.

According to the embodiment depicted in FIG. 2, aggressive transmission signal 114 utilizes an LTE-U duty cycle 204 and an LTE-U waveform 206. Wi-Fi transmission 112 includes a periodic cadence of CTS frames 208 and RTS frames 210 between Wi-Fi device 104 and access point 108. For purposes of this discussion, CTS frames 208 and RTS frames 210 are described as being transmitted from and received by access point 108, respectively. Nevertheless, the principles described herein are equally operable considering CTS frames 208 being received by Wi-Fi device 104, and RTS frames 210 being transmitted therefrom.

In an exemplary operation, a wireless transceiver (not shown) of Wi-Fi device 104 (FIG. 1) transmits a CTS message, for each CTS frame 208, according to IEEE 802.11 standards. In this example, the CTS message may include, without limitation, the following attributes: (i) a destination address, which is the MAC address of the transceiver; and (ii) a duration, which is a maximum duration assigned as a predetermined value and a periodicity T. Once received and processed, the CTS message functions to silence surrounding Wi-Fi transceivers for the duration of, and the transceiver of Wi-Fi device 104 is able to capture the channel energy activity for duration T. Data for this captured channel energy activity may then be stored in a memory (not shown) of Wi-Fi device 104, and then combined with previous captured data in the memory, if any. At the end of the capture duration/periodicity T, if the accumulative duration has not exceeded a pre-specified observation period S, expected to be the ON LTE-U cycle duration, the transceiver of Wi-Fi device 104 transmits another CTS frame and repeats the process described immediately above, with the same periodicity.

Once the value of the capture duration T is greater than the specified observation period S (e.g., 160 ms), the AP or station will no longer be able to receive the CTS signals due to the ongoing LTE traffic, a processor (also not shown) of Wi-Fi device 104 (or access point 108) is configured to perform an analysis of the captured RTS or CTS data. In this analysis phase, the processor is configured to compare the measured received power of the captured RTS or CTS data to a predefined threshold. If this predefined threshold has been reached or exceeded, the processor determines that no duty-cycled LTE has been detected. That is, the processor makes a determination that Wi-Fi device 104 is not in the presence of an aggressor transmission signal. In an exemplary embodiment, once the determination has been made that in aggressive, non-cooperative signal is not interfering with the Wi-Fi transmission, the analysis process may and, and relevant detection data stored in the memory may be discarded. If, however, the predefined threshold has been reached, in some embodiments, the processor is configured to perform further analysis of the captured data to compare the captured data to pulse characteristics of the duty-cycled LTE (e.g., LTE-U duty cycle 204).

More particularly, the comparison of the captured data may be performed with consideration of the ON portion of duty cycle 204 during the observation period S. If a portion of the observation period S overlaps the ON portion of duty cycle 204, the captured data would include received RTS or CTS signals (in consideration of whether the respective 802.11 node is an AP or a station). In this example, when the reception of the RTS or CTS signals is periodically discontinued with for a period of time which is multiple of 10 ms, then the processor utilizes the protocol to decide whether the respective 802.11 node (either AP or station) is subject to an aggressor LTE-U waveform 206 either in the ON or OFF state. When the observation period S is greater than the ON portion of duty cycle 204, the entire duration of the ON portion may be indicated within the captured data. Under either circumstance, a correlation between the captured data and the duty-cycled LTE is established from processing the captured data. In at least one embodiment, when the observation period S is greater than the duration of the ON portion of duty cycle 204, the results from a comparison algorithm are further transmitted to a centralized system processor (not shown) for comparison with the captured data relating to the duration of the ON portion received by the same 802.11 node, but based on the reception of RTS or CTS signals received from other surrounding Wi-Fi nodes within a predetermined vicinity of Wi-Fi device 104. Such additional data from other Wi-Fi devices may be used by Wi-Fi device 104 and access point 108 to further validate the probability that interference (e.g., interference 116, FIG. 1) in Wi-Fi transmission 112 is caused by aggressive transmission signal 114.

Referring back to FIG. 2, in the exemplary embodiment, RTS frames 210 are transmitted (e.g., by AP 108, FIG. 1) during the presumed aggressor transmission activity, with a cadency of 10 milliseconds (ms), for a capture duration T of $40*k$ ms, where k is an integer equaling 1, 2, 4, 6, 8, etc. According to this exemplary embodiment, a carrier-sensing adaptive transmission (CSAT) cycle of T=40 ms, employed by the LTE-U aggressor system, is targeted. Nevertheless, the operational principles described herein are fully applicable to algorithms applying a duration T equaling 20, 80, 160, or 360 ms, or multiples thereof. Once an RTS frame 210 is so received, a serviced station (e.g., Wi-Fi device 104) of the system (e.g., system 100, FIG. 1) is configured to respond with an appropriate CTS frame 208.

In the alternative embodiment, RTS frames 210 are transmitted every 10 ms (e.g., by Wi-Fi device 104, FIG. 1), and without losing generality, for RTS frames 210 having periodic detection intervals (i.e., periods between frames) of 5 ms, 10 ms, 20 ms, 40 ms, or 80 ms. In this alternative embodiment, the particular 802.11 node (e.g., AP 108, FIG. 1) receiving the transmitted RTS frame(s) 210 is configured to respond with an appropriate CTS frame 208.

If ongoing aggressor LTE-U activity is present, CTS frames 208 will only be received during the LTE-OFF portion of duty cycle 204, the servicing AP (e.g., access point 108) is generally expected to decode CTS frames 208 for only half of duty cycle 204. Accordingly, the application processor (disposed within Wi-Fi device 104 and/or access point 108, for example) is configured to make a determination of the presence of an aggressive transmission signal based on the number of CTS frames received within a predetermined time period. In some embodiments, where neighboring random traffic is present, processing of the LTE-U envelope may utilize averaging algorithms. Where duty cycle 204 static/consistent, the occurrence of the LTE-OFF portion can then be easily predicted, and the target STA/AP will suppress the transmission of unnecessary CTS frames 212 that occur during the LTE-ON portion of duty cycle 204, which will not generate a corresponding PS frame/message in response thereto while the LTE signal is ON. By predicting duration of the of the LTE-ON portion, additional power can be saved by suppressing the generation of unneeded RTS frames.

Referring again to FIG. 2, in an exemplary embodiment, the PHY Register is implemented to register instances of received CTS frames 208. In this exemplary embodiment, one station (Wi-Fi device) is discussed with respect to one AP. Nevertheless, a person of ordinary skill in the art will appreciate the applicability of the principles described herein for a plurality of stations/devices within the vicinity of an AP (discussed further below). In this example, an LTE-U signal has a cycle of 40 ms, and an 0xFF PHY Register has 8 bits written in accordance with a reference clock signal CLK of 10 ms and covering a total observed duration of 80 ms (i.e., two times the expected LTE-U cycle). Register 0xFF is used by the LMAC/PHY layers of the receiving 802.11 node to read/write the detected RTS or CTS detection information (i.e., register CTS occurrences), and this process of operation is also applicable for CSAT=20 ms. A CSAT cycle of 80 ms, for example, could require a 16-bit register, for RTS periodicity of 10 ms. Other embodiments may use a variety of PHY register sizes (8, 16, 32 bits, etc.) for different RTS periodicities targeting various LTE cycle ON or OFF durations.

In an exemplary operation, a logical masking procedure is further implemented to produce particular resultant digital outcomes. For example, for a logical result of 00 (hexadecimal), the processor will determine that there is no aggressive LTE-U operation occurring. For a logical result of 0F, F0 (also hexadecimal) or x1111y (for an 8-bit packet), the processor determines that an aggressive LTE-U operation is detected.

In an alternative embodiment, a PHY Register 0xFFFF having 16 bit is implemented to register the instances of received RTS or CTS frames 208. In this alternative embodiment, 0xFFFF PHY Register is written in accordance with CLK=10 ms, for a total duration of CTS transmission of 160 ms and is used by the LMAC/PHY layers to read/write the CTS detection information from STA(i), where i is an integer from 1 to N, indicating that the capability of the algorithm is increased to i stations. From the RTS or CTS detection information, a cumulative distribution function (CDF) of a variable X(i), where X(i) represents a string length of consecutive "1"s detected by the receiving AP or station and captured accordingly in the STA(i) register; this string can be employed for determining the probability of an occurrence of an aggressive LTE-U signal. From this information, a matrix of size N×16 can be constructed to reflect the CTS frames received from the N Wi-Fi devices 104.

In operation of the alternative embodiment, probabilities P1 (X(i)=4) and/or P2 (X(i)=8) are calculated, as well as CDF(P1) and/or CDF(P2). In the case where CDF(P1) or CDF(P2)>m (where m=a predetermined probability of an LTE duty cycle occurrence, m=0.8), then the processor of a target AP (e.g., access point 108, FIG. 1) determines the presence of an interference (e.g., interference 116, FIG. 1) generated by an LTE-U Node (e.g., node 106, FIG. 1). The operations of the exemplary and alternative embodiments are described further below with respect to FIG. 3.

Figure 3:
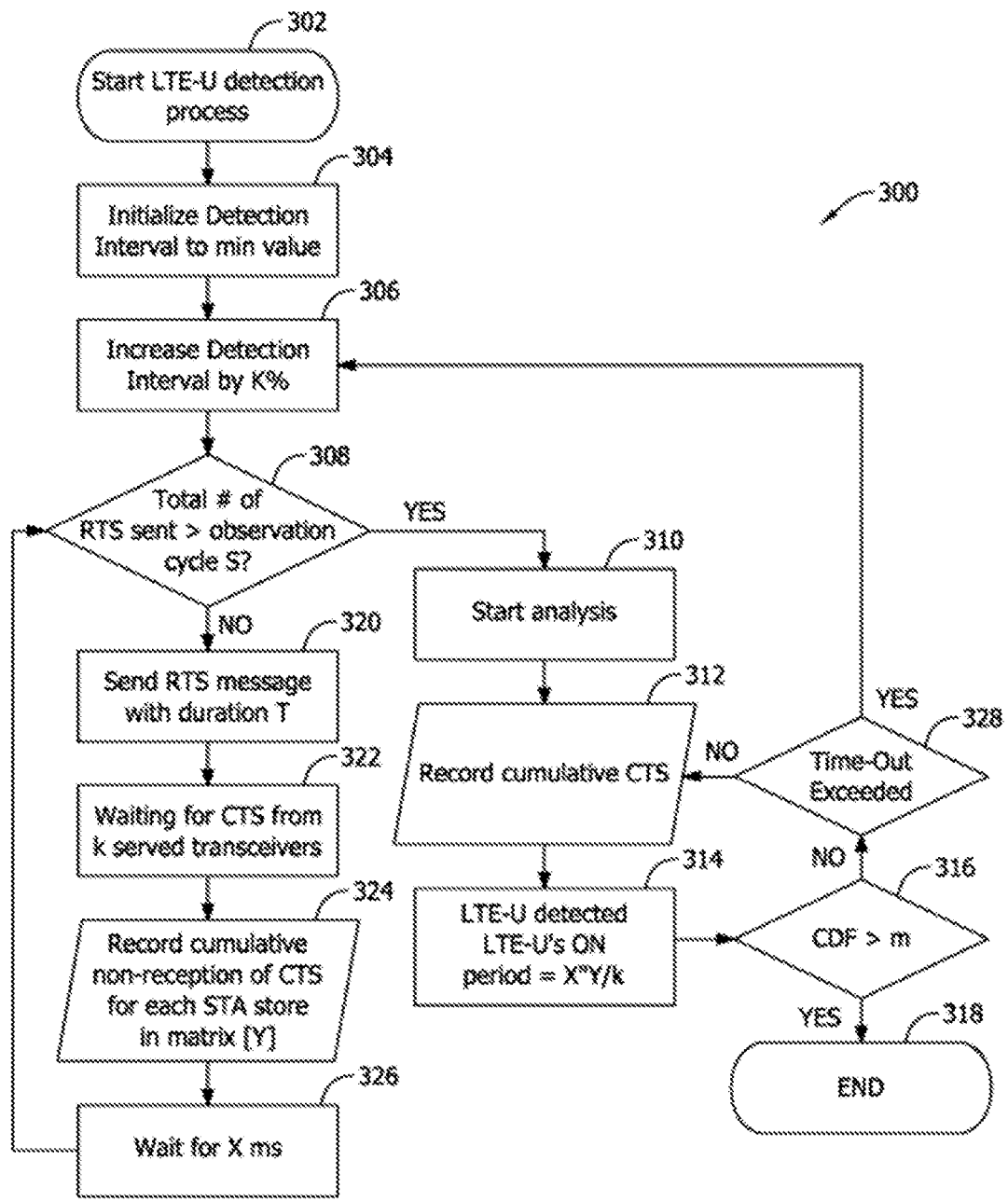
FIG. 3 is a flow chart diagram of an exemplary adaptive process for detecting an aggressive signal.

FIG. 3 is a flow chart diagram of an adaptive process 300 for detecting an aggressive signal. In the exemplary embodiment, the LMAC of the AP defines the PHY register (e.g., 0xFF) to read/write the CTS detection information before the transmission of greater than or equal to X/n number of RTS signals, where X=CSAT cycle duration (20 ms, 40 ms, 80 ms, 160 ms, etc.), and where n=LTE-U duty cycle (n≤1). The PHY Register is then advantageously utilized to write therein the presence or absence of received CTS messages as a 1 or 0, respectively, expected to be received with a certain periodicity (e.g. 10 ms). In the exemplary embodiment, one such register is defined for each target station. A target matrix (e.g., 0xFFFF) can then be established to have a size k*m of binary values, where k=number of stations polled, and m=number of clock cycles (e.g., each clock cycle has a duration of 10 ms, signifying the periodicity of RTS signals transmission).

In the exemplary embodiment, process 300 is implemented at either the station level or the AP level. For instances where process 300 is triggered by a station transceiver, the target transmission station will wait for CTS responses from neighboring stations or access points; in another embodiment, a receiving station aware of the RTS transmissions, will detect received RTS signals for a period of time larger than S. Where the trigger comes from either a station or AP, the target AP/STA will wait for a duration T (in ms), and then a processor or the STA/AP will analyze the content of the particular 0xFF set of registers. In another embodiment, a processor of the monitoring AP/STA will analyze the content of the set of 0xFFFF registers. An amount of successfully received CTS frames/messages is then recorded as a value Y. According to the exemplary embodiment, the transceiver of the target STA/AP is configured to trigger more test cycles dependent on reaching a value greater than or equal to a target success probability (p), and the processor of the target STA/AP is configured to determine the duration of the LTE-U ON portion of the duty cycle (e.g., duty cycle 204) based on a calculation of X*Y/p.

If, during the LTE-U detection cycle, an LTE-U signature is not detected during a pre-configured time-out period, the processor of the respective device is configured to increase the detection interval by a pre-defined value K. In this respect, process 300 is different from the processing described above in the case of a static, regular duty cycle. As explained below in further detail, process 300 is further capable of detecting and adapting to aggressor LTE-U signals having a variable duty cycle, or the presence of a plurality of different LTE-U signals capable of causing interference in Wi-Fi transmission signals.

In the alternative embodiment, process 300 is implemented at the AP level. FIG. 3 is a flow chart diagram of an adaptive process 300 for detecting an aggressive signal. According to the alternative embodiment, the LMAC of the AP manages the read/write register (e.g., 0xFFFF) concerning the detected RTS information resulting from the reception of number RTS frames 208 greater than or equal to X, where the RTS frames 208 are measured every T=10 ms for a duration of 160 ms (for an expected LTE cycle duration of 80 or 160 ms), and where X=16T, where n is the number of consecutive RTS signals/frames received (at 10 ms intervals), and where X(i) represents a maximum length of consecutive "1" or "0" binary values representing a detected or non-detected RTS, respectively, for a particular station STA(i).

The PHY Register is then advantageously utilized to write therein the received CTS presence in register 0xFFFF as a "1." In this alternative embodiment, one such register is also defined for each target station, and a processing matrix including binary values and having a size n*16m can then be established, where n=number of stations polled, and m=number of 160 ms cycles under test. In one embodiment m=1, therefore the underlying matrix has a size of n*16. According to this alternative, a processor of the serving AP is configured to monitor the RTS requests from neighboring stations, STA(i). The target AP (e.g., AP 108, FIG. 1) will wait for 160*m (in ms), where $k_1$>2k, and then a processor of the target AP is configured to begin analyzing the content of the matrix.

Similar to the exemplary embodiment, above, in the alternative embodiment the transceiver of the target AP is configured to trigger more test cycles dependent on the target success probability (p). The processor of the target AP is configured to determine the duration of the LTE-U OFF or ON portions of the duty cycle (e.g., duty cycle 204) based on a calculation of the CDF of the X(i) probability distribution function P(Xi)≥p (for the threshold m). Similar to the exemplary embodiment, described above, if, during the LTE-U detection cycle of this alternative embodiment, an LTE-U signature is not detected for the time-out period, the AP processor is configured to increase the detection interval by a pre-defined value K. Once the detection interval reaches 640 ms, for example, the process is terminated since the algorithm didn't detect any LTE-U aggressor.

Process 300 is described in further detail as follows. In both the exemplary and alternative embodiments, process 300 begins at step 302. At step 302, process 300 starts the LTE-U detection process. Process 300 then proceeds to step 304, where a processor of a STA/AP initializes the detection interval to a predetermined minimum value (e.g. 20 ms). At step 306, process 300 increases the detection interval by K percent, and proceeds to step 308. In one embodiment K=100%. Step 308 is a decision step. Step 308, process 300 determines if the total number of RTS frames transmitted is greater than the observation cycle S.

When the total number of transmitted RTS frames is greater than the observation cycle S, process 300 proceeds to step 310, where process 300 begins its analysis subprocess, and then proceeds to step 312. In step 312, process 300 records the number of received consecutive CTS signals having the same value, and proceeds to step 314. In step 314, process 300 utilizes a processor of the STA/AP to render a determination that the signature of an LTE-U signal is detected, and also a calculation of the duration of the LTE-U-ON portion of the duty cycle according to X*Y/p, as described above. Process 300 and proceeds from step 314 to step 316. Step 316 is a decision step. In step 316, the processor of the target STA/AP determines whether the CDF of P1 or P2 is greater than m, as described above. If, in step 316 the processor determines that the CDF of P1 or P2 is greater than m, process 300 then proceeds from step 316 to step 318, where process 300 terminates or restarts back at step 302.

Referring back to step 308, if the total number of transmitted RTS frames is not greater than the observation cycle S, process 300 instead proceeds to step 320, where the RTS message is transmitted with a duration T. Process 300 then moves from step 320 to step 322, where the processor of the target STA/AP waits for CTS frames from a number k of served transceivers in the neighborhood. Process 300 then proceeds to step 324, where a number of cumulative, non-received CTS frames are recorded as the value Y for each station STA(i) subject to process 300. Process 300 then proceeds from step 324 to step 326, where the respective transceiver of the target STA/AP waits for a period duration of X (in ms), which, in some cases, is equal to the targeted CSAT duration T. Process 300 then proceeds from step 326 back to decision step 308, repeats the process of step 308.

Referring back to decision step 316, if the CDF of P1 or P2 is not greater than m, process 300 proceeds from step 316 to step 328. P1 represents the probability of detecting a max string of 4 "0" or"1" binary values for STA(i), with I=1 . . . N. P2 represents the probability of detecting a max string of 8 "0"s or "1"s. for STA(i), with i=1 . . . N. Other embodiments may use probability functions associated with strings of 16 or 32 consecutive "1" or "0". Step 328 is also a decision step. In step 328, process 300 determines whether the predetermined time-out duration has been exceeded. If the predetermined time-out duration has been exceeded, process 300 proceeds from step 328 back to step 306, where the detection interval is increased, and process 300 and then proceeds from step 306. If, on the other hand, the processor determines that the predetermined time-out duration has not been exceeded, process 300 proceeds from step 328 back to step 312, where a number of cumulative CTS frames is recorded, and process 300 will then continue from step 312.

In the alternate embodiment of process 300, many of the individual steps are identical, and the sequence of events and decision steps is substantially the same. For example, steps 302, 304, 306, 316, 318, and 328 are identical between the exemplary and the alternative embodiments. Steps 308-314 and 320-326, on the other hand, follow the same logical organization and relationship between the exemplary and the alternative embodiments. However, the substance of steps differs somewhat from the exemplary embodiment, due to the focus of the alternative embodiment originating solely from the AP.

For example, in the alternative embodiment, step A308 is still a decision step. In step A308, process 300 determines if the total number of RTS frames received is greater than the observation cycle S. If yes, process 300 proceeds to step A310, where process 300 begins processing, and then proceeds to step A312. In step A312, process 300 records the number of cumulative RTS frames received for Y stations, and proceeds to step A314. In step A314, process 300 utilizes a processor of the AP (e.g., access point 108, FIG. 1) to calculate the duration of the LTE-U ON/OFF period to equal P(X(i)={2, 4, 8})≥m, meaning the cumulative probability distribution of receiving a string length of 2, 4 or 8 of consecutive "1" or "0" with a probability >m. Process 300 proceeds from step A314 to step 316, similar to the exemplary embodiment, above.

Referring back to step A308, if the total number of received RTS frames is not greater than the observation cycle S, process 300 instead proceeds to step A320, where the AP transceiver is configured to continue to receive an RTS message every 10 ms. Process 300 then moves from step A320 to step A322, where the processor of the target AP waits for RTS frames from a number k of served stations. Process 300 then proceeds to step A324, where a number of non-received RTS signals are recorded (as "0") for each station STA(i) to be recorded in the related matrix for STA(i). Process 300 then proceeds from step A324 to step A326, where the transceiver of the target AP continues for 160 ms. Process 300 then proceeds from step A326 back to decision step A308, and then repeats the alternative process of step A308.

Accordingly, by utilizing only existing hardware present in both existing Wi-Fi devices/stations and AP use, the novel systems and methods described above thus realize significant advantages over conventional shared access systems by implementing the adaptive contention and mitigation techniques for polite, non-aggressive Wi-Fi transmissions coexisting with aggressive LTE-U transmission signals that utilize the same shared access systems. The present systems and methods are advantageously capable of detecting the signature of an aggressive LTE-U transmission utilizing only existing hardware such as the MAC and PHY layers, and existing protocols such as the LBT and IEEE 802.11. The systems and methods described herein are useful to detect the LTE-U signatures algorithms that in a simple sense count received RTS and CTS signals corresponding to a nearby aggressive transmission signal having a duty cycle, in the present systems and methods are adaptable for both a static duty cycle as well as a variable cycle for one or more such aggressive signals In some embodiments, RTS/CTS transmission reception can be dynamically altered according to the presence of one or more aggressive transmission signals, by increasing or decreasing the frequency of RTS signals. Through the algorithms implementing the RTS or CTS counts the processors of the stations/access points, reliable estimates of the existence of an LTE-U or the like the predicted with increasing accuracy, and the duration of both the LTE ON and LTE OFF state transmissions may be determined for both static and variable duty cycles and without requiring any embedded hardware added to a Wi-Fi device to directly detect an LTE-U transmission signal, as would node 106, FIG. 1, for example.

In the embodiments, the Wi-Fi device (e.g., Wi-Fi device 104, FIG. 1) is further configured to reduce MAC layer frame sizes to increase successful reception of the transmitted Wi-Fi signal. By determining the time when the periodic LTE-U transmissions are off (LTE OFF), the Wi-Fi device is capable of adjusting the MAC layer frame size to optimally occur within the period of the LTE OFF state, and thereby increase the probability of collision-free Wi-Fi transmissions.

According to the advantageous systems and methods disclosed herein, a Wi-Fi device, node, or transceiver is capable of realizing adaptation techniques for shared channel access models and mechanisms based upon the detection of aggressive technology signatures on the shared spectrum. Algorithms to implement any or all the above described processes may be implemented within an application processor, a MAC co-processor, or the UMAC/LMAC layers of supporting architecture of a station and/or AP, although the LTE-U correlation subprocesses will be more typically executed by an application processor on the AP side. A particular advantage though, of such implementations derives from the availability of the PHY layer being used in a non-conventional manner, in addition to the ability to avoid having to make any PHY changes or updates on either the AP or the station side.

Exemplary embodiments of shared access communication management systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless communication device, comprising:
a memory;
a physical layer (PHY);
a transceiver configured to wirelessly send and receive transmission data and message frames; and
a processor configured to (i) trigger cycles of the message frames at a selected cadence for a specified duration, (ii) store an acknowledgement of each received message frame in the memory, and (iii) determine a transmission signature of a wireless signal within a vicinity of the wireless communication device based at least in part on the stored clear-to-send (CTS) acknowledgements during the specified duration.

2. The system of claim 1, wherein the processor is further configured to cause the transceiver to transmit message frames at intervals having a cadence of at least two frames for each instance of a targeted carrier-sensing adaptive transmission (CSAT) cycle.

3. The system of claim 2, wherein the processor is further configured to cause the transceiver to increase the cadence in response to detection of a variable duty cycle.

4. The system of claim 2, wherein the processor is further configured to (i) calculate a cumulative distribution function (CDF) based on a number the stored acknowledgements within the memory, and (ii) determine the presence of the signal based on the calculated CDF being greater than a predetermined threshold.

5. The system of claim 4, wherein the calculated CDF greater than the predetermined threshold indicates a prescribed confidence level, and wherein the processor is further configured to cause the transceiver to increase a message frame detection interval upon determining that the wireless signal is not detected within a predetermined duration at the prescribed confidence level.

* * * * *